United States Patent

Wayne et al.

[11] 4,229,079
[45] Oct. 21, 1980

[54] ELECTRO-OPTIC MODULATOR WITH IMPROVED ACOUSTO-OPTIC SUPPRESSION, HEAT TRANSFER AND MECHANICAL SUPPORT

[75] Inventors: Robert J. Wayne, Glastonbury; Robert W. Henschke, East Hampton, both of Conn.

[73] Assignee: United Technologies Corporation, Hartford, Conn.

[21] Appl. No.: 926,490

[22] Filed: Jul. 20, 1978

[51] Int. Cl.³ .............................................. H01S 3/098
[52] U.S. Cl. .............................. 350/356; 331/94.5 M
[58] Field of Search .................... 331/915 M; 350/356

[56] References Cited

U.S. PATENT DOCUMENTS

| | | | |
|---|---|---|---|
| 3,454,325 | 7/1969 | Ohm | 331/94.5 M |
| 3,653,743 | 4/1972 | Kiefer et al. | 350/356 |
| 3,663,091 | 5/1972 | Lee | 350/356 |

Primary Examiner—William L. Sikes
Assistant Examiner—Leon Scott, Jr.
Attorney, Agent, or Firm—Lawrence A. Cavanaugh

[57] ABSTRACT

An improved electro-optic moduator device is disclosed which provides strain-free mounting of an electro-optic crystal within a housing assembly and suppression of acousto-optic effects within the crystal. An acoustic matching liquid having an acoustic impedance substantially matching the acoustic impedance of the electro-optic crystal is disposed within the housing enveloping longitudinally the crystal. The acoustic matching liquid effectively suppresses the acousto-optic resonances within the crystal by coupling the acoustic energy out of the crystal into the liquid. The liquid enveloping the crystal also provides a uniform heat conduction path for minimizing thermal gradient variations and the resulting thermally induced strain within the crystal. A zinc oxide suspension in silicone oil is an exemplary acoustic matching liquid for gallium arsenide or cadmium telluride crystals. In one embodiment the acoustic matching liquid has a consistency of a slurry capable of being recirculated through the housing to improve the heat transfer characteristics of the liquid. In a further embodiment an acoustic absorber, disposed in a spaced apart relationship about the crystal, is adapted for absorbing acoustic energy transmitted through the liquid. An elastomeric seal at each end of the crystal provides a liquid-tight seal between the housing and the crystal to maintain the liquid within the housing and provides a soft-mounting structure to minimize thermally and mechanically induced strain within the crystal.

12 Claims, 6 Drawing Figures

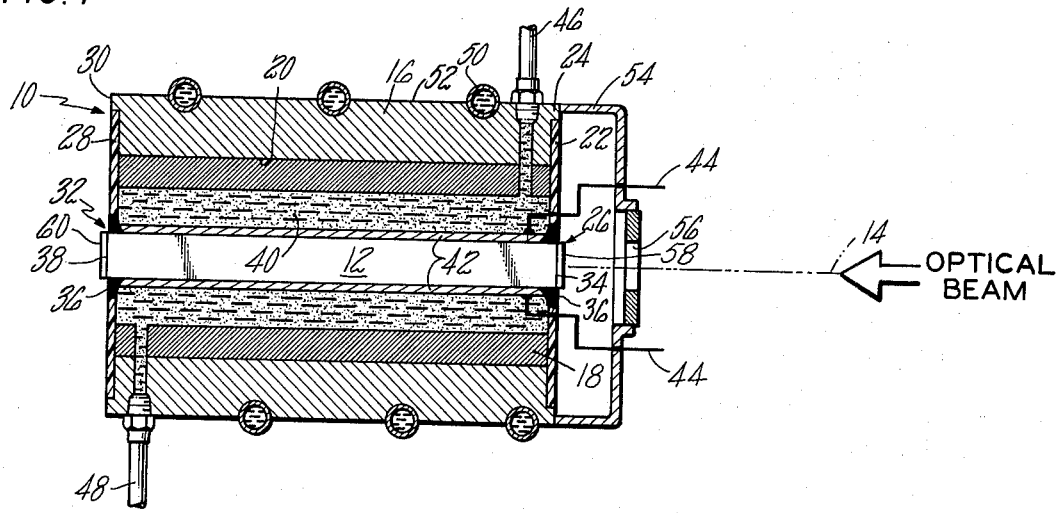
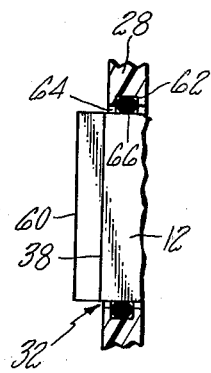
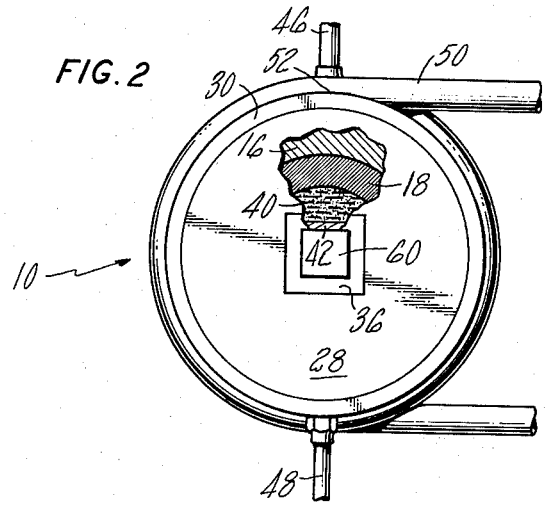

ELECTRICAL SIGNAL ON MODULATOR

100 μSEC

TIME

OPTICAL POWER

OFF SCALE

OFF SCALE

TIME

RESULTANT MODULATION WITH NO DAMPING COMPOUND

OPTICAL POWER

OFF SCALE

OFF SCALE

TIME

RESULTANT MODULATION WITH DAMPING COMPOUND

ELECTRO-OPTIC MODULATOR WITH IMPROVED ACOUSTO-OPTIC SUPPRESSION, HEAT TRANSFER AND MECHANICAL SUPPORT

BACKGROUND OF THE INVENTION

The invention herein described was made in the course of or under a contract or subcontract thereunder with the Department of the Army.

This invention relates to optical devices and more particularly to an electro-optic device having improved acousto-optic suppression, heat transfer and mechanical support.

Intracavity modulation of radiation from carbon dioxide lasers, utilizing electro-optic crystals such as cadmium telluride or gallium arsenide has been utilized to condition the radiation for various applications. By operating the crystal in a phase modulation mode, narrow band FM or chirp modulation of the radiation can be obtained while broadband AM or coupling modulation is obtained by operating the crystal in a polarization modulation mode. Additionally the laser may be Q-switched, Q-switched and cavity dumped and mode locked using the crystal in either the phase or polarization mode of operation. In either mode of operation, the crystal is activated by providing an electric field typically across two parallel sides of the crystal.

For crystals having electro-optic properties, the application of an electric field across the crystal produces a linear electro-optic effect wherein the indexes of refraction for plane polarized light in orthogonal planes are altered by an amount directly proportional to the strength of the applied electric field. The alterations to the indexes of refraction are used to modulate the radiation from the laser.

The application of an electric field across a crystal having electro-optic properties typically also produces a piezoelectric effect within the crystal since crystals having electro-optic properties typically also have piezoelectric properties. The resulting strain induced into the crystal by the piezoelectric effect perturbates the birefringence of the crystal producing a deleterious effect on the crystal's ability to modulate the radiation. The perturbation caused by this induced strain is termed the piezo-optic or acousto-optic effect. It is of the same nature as, and is in addition to, the electro-optic effect. As a result of this acousto-optic effect, distortion of the modulation characteristics of the electro-optic device occurs particularly when the crystal is activated with an electric field having a frequency in near coincidence with an acoustic resonant frequency of the crystal. This distortion is enhanced when the activation is produced by high voltage pulses having rectangular pulse shapes with a high frequency content in the fast edges of the pulses. The utilization of high voltage rectangular pulses, typically required for Q-switching and cavity dumping lasers to obtain optical pulses having short durations, readily excites the acoustic resonances within the crystal.

For rectangular crystals, the acoustic resonant frequencies can be calculated if the crystal dimensions and sound velocities are known. A typical cadmium telluride crystal will exhibit a sound velocity of essentially 3020 meters per second for longitudinal waves and essentially 1850 meters per second for transverse waves, both at a temperature of 25° C. If the lowest order resonant acoustic frequency has a half wavelength equivalent to a typical crystal dimension, resonant frequencies on the order of a few hundred kilohertz will result.

The efficient utilization of electro-optical crystals for modulating carbon dioxide lasers requires the acousto-optic effect be minimized by effectively coupling the acoustic energy out of the crystal. This can be accomplished by suppressing the reflection of acoustic energy at the crystal boundaries. Kiefer et al in U.S. Pat. No. 3,653,743 discloses an electro-optic device having an acoustic energy absorbing material bonded to the surfaces of the crystal. The acoustic energy absorbing material is chosen to have an acoustic impedance substantially matching that of the crystal to minimize acoustic reflections at the crystal wall. Suggested acoustic energy absorbing materials include lead, lead glass, and titanium for matching to cadmium telluride and gallium arsenide crystals. Good acoustic impedance matching to cadmium telluride is also obtained using beryllia and alumina.

While suppression of acousto-optic energy is obtained utilizing this technique, severe constraints on the choice of matching material for use as acoustic energy absorbing material exists. If the acoustic absorbing material is an electrical insulator, it may be used on all four sides of the electro-optic crystal; if it is electrically conductive it may only be used on the two electrode surfaces of the crystal to avoid arc-over between the electrodes. In addition, since the solid acoustic absorbing materials are bonded to the electro-optic crystal to obtain a good acoustic match at the interface, a slight difference in the thermal expansion of the two materials leads to a strain induced birefringence in the crystal with the resulting diminution in performance and with laser action being extinguished if the strain-induced birefringence in the crystal becomes sufficiently large. Additionally, fracturing of the electro-optic crystal can occur as the crystal is cycled over the normally encountered temperature extremes.

A further limitation of prior art devices is that for moderate electrical and optical power inputs to the electro-optical modulator, a uniform means of removing the heat deposited in the crystal must exist. Ideally the acoustic absorbing material should have good thermal conductivity to transfer heat from the crystal to an external sink. Preferably all sides of the crystal should be thermally stabilized to minimize variations in the temperature gradients in the crystal since the refractive index of cadmium telluride is temperature dependent. For example, a 1° C. shift in temperature in a cadmium telluride crystal having a five centimeter dimension will produce a 0.625 $\lambda$ phase shift. Additionally the thermal gradients produced in the crystal evidence themselves in a lensing effect on the transmitted beam. A further limitation of the prior art devices is that attaching acoustic absorbing material to the fragile cadmium telluride or gallium arsenide crystals increases the difficulties of mounting the crystal within the modulator assembly without imposing mechanical strain. Additionally external vibrations are typically transmitted through the acoustic absorbing material into the crystal to produce a further deterioration in performance. The present invention provides a means for overcoming the limitations noted for prior art devices.

SUMMARY OF THE INVENTION

An object of the present invention is the suppression of acousto-optic effects in electro-optic crystals.

A further object is to provide strain-free mounting of an electro-optical crystal within an electro-optical modulator assembly.

In accordance with the present invention an improved electro-optic modulator comprises a crystal having a longitudinal axis, a housing longitudinally disposed about the crystal in a spaced apart relationship, means for supporting the crystal within the housing wherein said means provides a liquid-tight seal of the elastomeric type between the crystal and the housing and cooperates with the crystal and the housing to define a cavity therebetween, liquid means disposed within the cavity enveloping longitudinally the crystal adapted for coupling acoustic energy from the crystal, and means for applying an electric field across the crystal.

A primary feature of the present invention is a liquid, having a suspension of metal oxide powder therein longitudinally enveloping the crystal, adapted for providing an acoustic impedance match with the crystal. Additionally the liquid is adapted for providing high acoustic absorption to the sides of the crystal. Also the liquid is adapted for providing a thermal conductivity path for conducting heat from the crystal. Preferably the liquid comprises a suspension of a high concentration of zinc oxide powder in silicone oil. In one embodiment, the liquid has a viscosity such that the liquid forms a slurry capable of being recirculated through the cavity. The embodiment further includes means for passing the slurry into and out of the cavity.

An additional feature of the present invention is an elastomeric seal which functions both to seal the liquid within the cavity and to provide a soft mounting structure to position the crystal within the housing. Additionally, in a further embodiment, a lead sleeve, disposed within the cavity about the crystal juxtaposed an interior surface of the housing, is adapted for absorbing acoustic energy transmitted through the slurry. The housing includes coolant means for transferring heat conducted thereto to an external sink.

An advantage of the present invention is that the elastomeric seal on each end of the electro-optical crystal provides a liquid-tight seal to enclose the cavity while supplying a support structure for the crystal which induces a minimal mechanical strain within the crystal. Additionally the liquid within the cavity provides a high thermal conductivity path for conducting heat from the crystal to the housing, is an electrical insulator and provides good acoustic matching and high acoustic absorption to the crystal surfaces to enhance coupling acoustic energy out of the crystal. Also recirculating the slurry through the cavity improves the heat transfer characteristics of the slurry and allows the electro-optical crystal to be utilized with higher power optical beams. Additionally the slurry envelopes the crystal to increase the thermal conduction from the crystal and to provide a more even temperature distribution within the crystal to minimize thermally induced strains and the resulting refractive index changes within the bulk of the crystal.

The foregoing and other objects, features and advantages of the present invention will become more apparent in the light of the following detailed description of preferred embodiments theeof as discussed and illustrated in the accompanying drawing.

BRIEF DESCRIPTION OF THE DRAWING

FIG. 1 is a simplified cross-sectional side view showing the major elements of the present invention;

FIG. 2 is a left side view partially broken away and partially in section of the apparatus as shown in FIG. 1;

FIG. 4 is a simplified schematic of an embodiment of the liquid-tight means for fixedly supporting the crystal within the housing as shown in FIG. 1.

DESCRIPTION OF THE PREFERRED EMBODIMENT

Figure 3A:
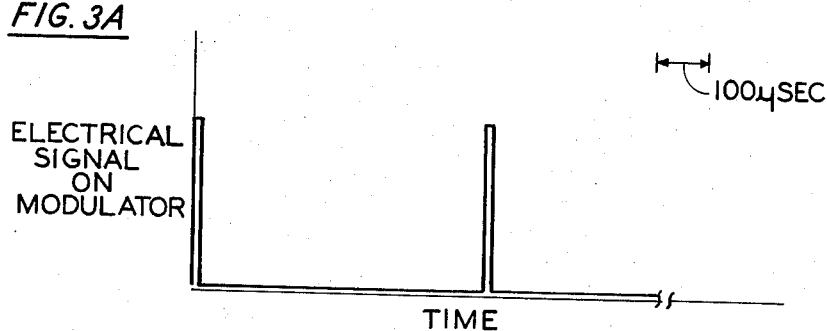
FIGS. 3A, 3B and 3C are graphs containing respective curves illustrating the electrical pulses applied to the crystal, the optical signals resulting from the crystal when no acoustic impedance matching liquid is disposed about the crystal, and the optical signals resulting from the crystal when an acoustic impedance matching liquid is disposed about the crystal.

FIG. 1 shows a simplified cross-sectional view of an electro-optic modulator 10, in accordance with the present invention, having improved acousto-optic suppression, heat transfer and mechanical support characteristics. The modulator includes an electro-optic crystal 12 typically having a rectangular cross section with at least two sides parallel to one another with a longitudinal axis disposed therebetween symmetrically about a beam axis 14, a housing 16 longitudinally disposed about the electro-optical modulator in a spaced apart relationship, an acoustic absorber 18 disposed between the housing 16 and the electro-optical crystal juxtaposed an interior surface 20 of the housing, a first end plate 22 fixedly attached to the first end 24 of the housing and having an aperture 26 disposed therein symmetrically about the beam axis 14 and a second end plate 28 fixedly attached to the second end 30 of the housing 16 having an aperture 32 disposed therein symmetrically about the beam axis 14. A first end 34 of the electro-optical crystal extends through the first aperture 26 within the first end plate 22 and is fixedly maintained within the housing by elastomer material, typically a commercially available silicone RTV rubber disposed about the crystal proximate the first end within the aperture, providing a soft mounting of the crystal within the end plate and which cooperates with the first end plate to provide a liquid-tight seal 36 between the crystal and the housing. A second end 38 of the crystal extends through the second aperture 32 within the second end plate 28 and is fixedly maintained within the housing with an elastomer material in the same manner as the first end to provide soft mounting of the crystal and a liquid-tight seal. The first and second end plates and the seals cooperate with the sides of the crystal and the acoustic absorber 18 to define a cavity 40 therebetween. An acoustic matching liquid, such as a suspension of metal oxide particles in a silicone oil, is disposed within the cavity 40 typically completely filling the cavity. Electrodes 42 are deposited on opposite parallel sides of the electro-optic crystal in accordance with well known techniques and have electrical leads 44 attached theeto to enable an electric field to be imposed across the crystal. An entrance port 46 extends through the housing 16 and the acoustic absorber 18 into the cavity 40 and an exit port 48 extends from the cavity through the acoustic absorber 18 and the housing 16. Coolant tubes 50 are symmetrically disposed about the exterior surface 52 of the housing. A radiation shield 54, disposed on the first end of the housing, has an iris diaphram 56 centrally disposed therein symmetrically about the beam axis.

FIG. 2 shows a partially roken away simplified schematic of an end view of the modulator 10 wherein the coolant tubes 50, the housing 16 and the acoustic absorber 18 are symmetrically disposed in a spaced apart relationship about the electro-optic crystal. Referring now to FIGS. 1 and 2, the electro-optic crystal 12 is formed from material capable of exhibiting an electro-optic effect including but not limited to gallium arsenide (GaAs), cadmium telluride (CdTe), potassium dihydrogen phosphate (KDP), potassium deuterium phosphate ((KD*P), ammonium dihydrogen phosphate (ADP), copper chloride (CuCl), zinc sulphide (ZnS), zinc telluride (ZnTe), lithium niobate (LiNbO$_3$), lithium iodate (LiIO$_3$), lithium tantalate (LiTaO$_3$), barium titanate (BaTiO$_3$) and quartz. For purposes of illustration, the following discussion of the specific embodiment of the invention will be made with respect to a crystal 12 of cadmium telluride having a square cross section.

The elastomer material disposed about the ends of the crystal forms an elastomeric seal 36 which provides a soft mounting structure for the electro-optical crystal 12 within the housing 16 to allow the crystal to be fully supported therein with minimum mechanical strain induced into the crystal by the mounting structure. The elastomeric seal also functions to alleviate mechanical strain in the crystal due to differential thermal expansion between the crystal and its surroundings and provides a soft mounting structure to cushion the crystal from sudden mechanical shocks when the modulator is in a high vibration environment.

The acoustic matching liquid is selected to have an acoustic impedance which substantially matches the acoustic impedance of the crystal and has high acoustic absorption to the crystal surface. For the exemplatory crystal material, cadmium telluride, a zinc oxide suspension in silicone oil such as the commercially available silicone heat transfer compound G641 from the General Electric Corporation is utilized. This compound is typically utilized as a heat transfer agent for mounting semiconductor devices such as power transistors to chassis and a heat sink. The compound has a very high concentration of zinc oxide particles resulting in a liquid having a paste-like consistency with good heat transfer and electrical insulation characteristics. The liquid completely fills the cavity and fully envelopes the electro-optic crystal providing electrical insulation around the electrodes 42 attached to the crystal to prevent arc-over between the electrodes and provides a good thermal conduction path between the crystal and the housing to facilitate the removal of heat generated within the crystal during operation. The good thermal conductivity results from the high concentration of zinc oxide within the liquid. The thermal conductivity of solid zinc oxide exceeds that of both alumina and lead. An added benefit of completely enveloping the crystal with the liquid is the relatively uniformly distributed heat conduction path surrounding the crystal. Variations in the temperature gradients within the crystal are minimized with the resultant minimization of changes to the refractive index of the crystal and the thermal lensing effects resulting therefrom. Additionally since the liquid is not mechanically bonded to the crystal, mechanical strain resulting from differential thermal expansion between the acoustic matching meterial and the crystal is not induced into the crystal.

The paste-like acoustic matching liquid is chosen to have an acoustic impedance closely matching the acoustic impedance of the crystal to minimize acoustic reflections at the crystal surfaces of the acoustic energy generated in the crystal due to the piezoelectric effect resulting from the application of an electric field across the crystal. The paste-like acoustic matching liquid is quite dissipative of the acoustic energy passing from the crystal due to acoustic scattering from the randomly distributed metal oxide particles disbursed therein. Any acoustic energy which is transmitted through the liquid is absorbed in the acoustic absorber 18. In the preferred embodiment the acoustic absorber is made of lead.

For higher power operation, coolant may be passed through the coolant tubes 50 to improve the heat transfer characteristics of the housing. Additionally the liquid within the cavity may be circulated therethrough through the entrance and exit ports 46, 48 to further increase the heat conduction capabilities of the material. For circulating the liquid, thinning the paste-like material may be necessary to form a slurry capable of flowing through the cavity.

In operation radiation passing through the iris diaphram 56 in the radiation shield 54 is incident onto the anti-reflective coating 58 on the first end of the crystal and passes into the crystal. The iris diaphram limits the diameter of the radiation passing therethrough to eliminate any optical power incident onto the seal and the end plates and to limit the spot size of the optical beam on the first end of the crystal. The end plates are preferably made of a dielectric material to avoid arc-over from the electrodes 42. The second end of the crystal preferably has a high reflection coating 60 thereon which may also act as the end mirror of the resonator forming the optical cavity of the laser. Utilizing the modulator as the end mirror substantially reduces reflection losses in the cavity. Alternatively, the second end of the crystal may have an antireflective coating thereon. The modulator is actuated by applying an electric field across the electrode by means well known in the art.

Figure 3B:
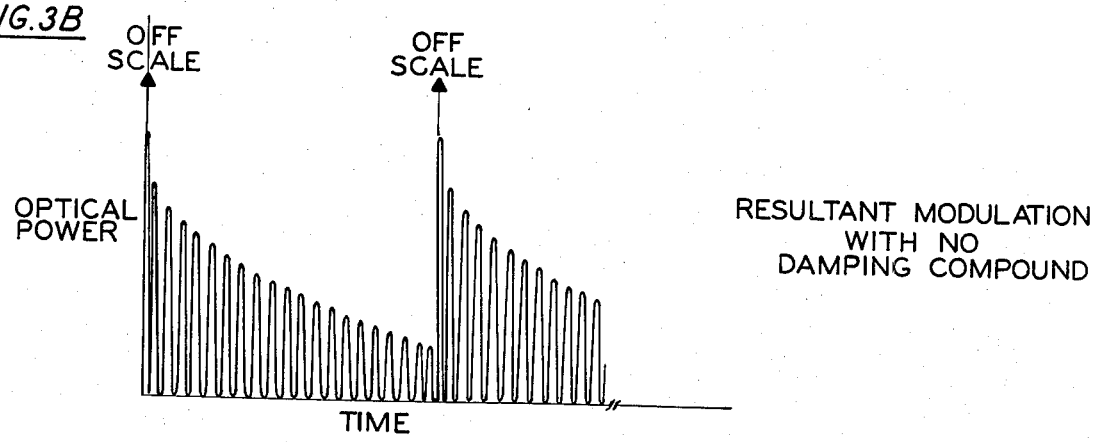
Figure 3C:
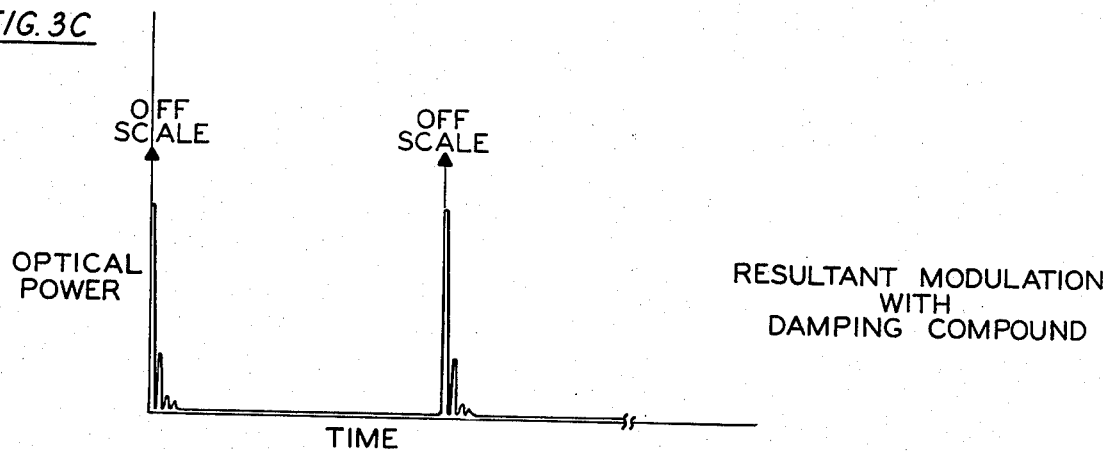

In the preferred embodiment for example, a train of 2.5 kilovolts, 1.5 microseconds rectangular electrical pulses, as shown in FIG. 3A, applied to a cadmium telluride crystal mounted as shown in FIG. 1 results in an effective half wave retardation of a beam of radiation from a carbon dioxide laser. Ideally the only optical signal that should pass out of the modulator is a 1.5 microsecond wide optical signal due to the electro-optic effect in the cadmium telluride. However, a train of electrical pulses imposed on an electro-optic crystal of cadmium telluride which is not enveloped with acoustic matching liquid produces a train of optical pulses as shown in FIG. 3B. The optical signal includes the 1.5 microsecond wide optical signal resulting from the electro-optic effect of the crystal as well as additional signals due to the piezoelectric nature of the crystal which causes resonant acoustic modes to be excited therein. The excited acoustic modes result in modulation of the optical beam producing a ringing of the optical pulses passing out of the modulator. As shown in FIG. 3B and 1.5 microsecond optical pulse produced by the electro-optic effect is approximately three to ten times larger than the largest spurious acousto-optic signal. FIG. 3C shows the resultant optical pulses when an acoustic matching liquid such as a suspension of zinc oxide particles in silicone oil is maintained in the cavity. The magnitude of the acousto-optical signal is significantly reduced and the acousto-optical ringing signal decays rapidly after the electro-optical signal is produced.

FIG. 4 shows an embodiment of the elastomeric seal shown in FIG. 1 wherein the first and second end plates 22, 28 have O-ring type grooves 62 within the side walls 64 defining the apertures 26, 32 respectively. O-rings 66 positioned within the grooves extend sufficiently toward the center of the apertures to provide soft mounting of the crystal within the housing. The O-ring seal also provides a liquid-tight seal to contain the acoustic damping material within the cavity. It is to be recognized that each end plate may be formed with one or more plates designed to accommodate an appropriate O-ring.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. An improved electro-optic modulator comprising:
   an elongated crystal of material capable of exhibiting an electro-optic effect said crystal having a first and second end at its longitudinal extremities;
   a housing longitudinally disposed about the crystal in a spaced apart relationship;
   means for supporting the first and second ends of the crystal within the housing wherein said means provides a liquid-tight seal between the crystal and the housing;
   an acoustic matching liquid disposed within a cavity enveloping longitudinally the crystal wherein said cavity is defined by the crystal, the housing and the means for supporting the first and second ends of the crystal and wherein said acoustic matching liquid has an acoustic impedance substantially matching the acoustic impedance of the crystal and has high acoustic absorption to the crystal; and
   means for applying an electric field across the crystal.

2. The invention in accordance with claim 1 wherein the means for supporting the first and second ends of the crystal within the housing includes:
   a first end plate fixedly attached to a first end of the housing, having an aperture disposed therein adapted for accommodating the first end of the crystal;
   a second end plate, fixedly attached to a second end of the housing, having an aperture disposed therein capable of accommodating the second end of the crystal;
   elastomeric material, disposed about the crystal proximate the first and second ends, adapted for providing a soft mounting structure to fixedly maintain the first and second ends of the crystal within the apertures of the first and second end plates respectively to position the crystal within the housing, wherein said elastomeric material provides a liquid-tight seal between the crystal and the end plates.

3. The invention in accordance with claim 1 wherein the acoustic matching liquid is a metal oxide suspension within a silicone oil.

4. The invention in accordance with claim 3 wherein the crystal capable of exhibiting an electro-optic effect is cadmium telluride or gallium arsenide and the metal oxide is zinc oxide.

5. The invention in accordance with claim 3 further including means for recirculating the acoustic matching liquid through the cavity.

6. The invention in accordance with claim 5 wherein the means for recirculating the acoustic matching liquid comprises an inlet port adapted for passing the acoustic matching liquid through the housing into the cavity and an exit port adapted for passing the acoustic matching liquid out of the cavity.

7. The invention in accordance with claim 1 further including an acoustic absorber disposed within the cavity juxtaposed an inner surface of the housing and longitudinally disposed in a spaced apart relationship about the crystal.

8. The invention in accordance with claim 1 further including coolant means disposed about the housing for cooling the electro-optic modulator.

9. The invention in accordance with claim 3 further including a radiation shield disposed on the first end of the housing having an aperture disposed therein adapted for passing radiation through the radiation shield to the crystal and for shielding the elastomeric material and the end plate from incident radiation.

10. An improved electro-optic modulator comprising an elongated crystal of material having a first end and a second end at its longitudinal extremities and capable of exhibiting an electro-optic effect;
    a housing longitudinally disposed about the crystal in a spaced apart relationship, having a first end and a second end;
    a first end plate, fixedly attached to the first end of the housing, having an aperture disposed therein adapted for accommodating the first end of the crystal;
    a second end plate, fixedly attached to the second end of the housing, having an aperture disposed therein capable of accommodating the second end of the crystal;
    elastomeric material, disposed about the crystal proximate the first and second ends, adapted for providing a soft mounting structure to fixedly maintain the first and second ends of the crystal within the apertures of the first and second end plates respectively to position the crystal within the housing, wherein said elastomeric material provides a liquid-tight seal between the crystal and the end plates wherein the end plates define the ends of a cavity disposed between the crystal and the housing;
    an acoustic absorber disposed within the cavity juxtaposed an inner surface of the housing and longitudinally disposed in a spaced apart relationship about the crystal;
    an acoustic matching liquid disposed within the cavity enveloping longitudinally the crystal wherein said liquid is a metal oxide suspension within a silicone oil having an acoustic impedance substantially matching the acoustic impedance of the crystal and a high acoustic absorption to the crystal; and
    means for applying an electric field across the crystal.

11. The invention in accordance with claim 10 wherein the crystal capable of exhibiting an electro-optic effect is cadmium telluride or gallium arsenide and the metal oxide is zinc oxide.

12. The invention in accordance with claim 10 further including means for recirculating the acoustic matching liquid through the cavity.

* * * * *